United States Patent [19]
Becker et al.

[11] 3,805,520
[45] Apr. 23, 1974

[54] PROCESS AND APPARATUS FOR REDUCING AIR POLLUTION FROM INTERNAL COMBUSTION ENGINES

[76] Inventors: Folke Becker, 1527 9th Avenue South, Birmingham, Ala. 35205; Hugh H. Jones, 2822 Thornhill Rd., Birmingham, Ala. 35213

[22] Filed: July 21, 1972

[21] Appl. No.: 273,781

[52] U.S. Cl............ 60/274, 60/279, 60/310, 60/311, 55/255, 55/257, 55/95, 423/212
[51] Int. Cl. ..... F02m 25/06, F01n 3/16, F01n 3/02
[58] Field of Search ............ 60/279, 297, 310, 311, 60/274, 309; 55/244, 246, DIG. 30, DIG. 41, 84, 95, 255, 256; 423/212

[56] References Cited
UNITED STATES PATENTS

| | | | |
|---|---|---|---|
| 2,147,671 | 2/1939 | Pratt | 60/279 X |
| 2,538,450 | 1/1951 | Gardner | 60/310 X |
| 3,566,583 | 3/1971 | Ashmore | 60/310 X |
| 2,087,411 | 7/1937 | Lundquist | 60/309 X |
| 3,722,189 | 3/1973 | Tourtellotte | 55/DIG. 30 |
| 3,282,047 | 11/1966 | Wertheimer | 60/310 X |
| 3,013,546 | 12/1961 | Bonifeld | 60/310 X |
| 2,921,432 | 1/1960 | Marcotte et al. | 60/309 X |

Primary Examiner—Carlton R. Croyle
Assistant Examiner—Robert E. Garrett
Attorney, Agent, or Firm—Jennings, Carter & Thompson

[57] ABSTRACT

Process and apparatus for reducing air pollution from an internal combustion engine wherein the lighter fraction of the products of combustion is separated from the heavier fraction and introduced into the engine air intake. The heavier fraction is passed through perforated conduits located within and adjacent the bottom of a closed receptacle having a treating mixture therein comprising triethylolamine, fullers earth and ethylene glycol with the level thereof being above the perforated conduits. Cooling conduits extend through the receptacle and baffles extend transversely of the receptacle above the mixture with a gas outlet above the baffles.

4 Claims, 5 Drawing Figures

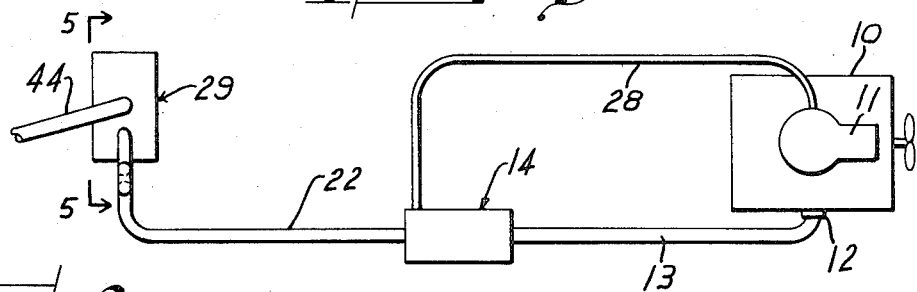
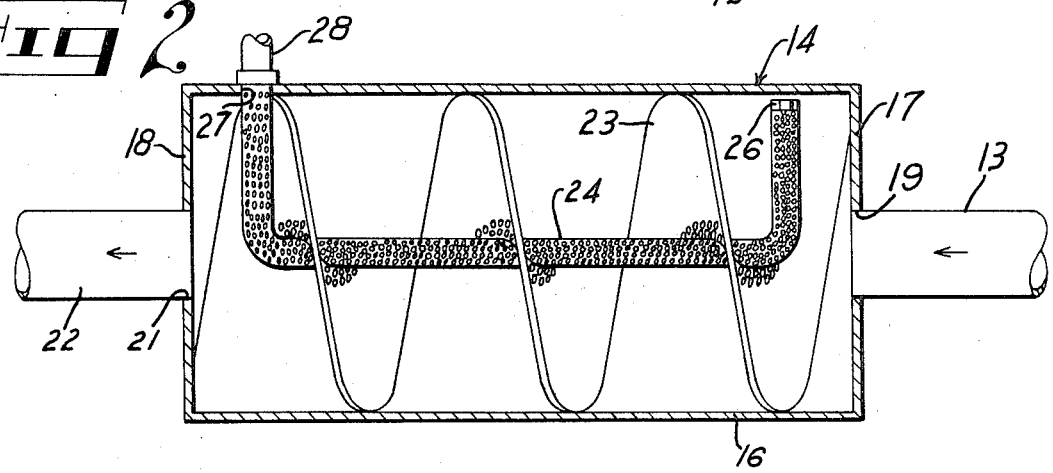
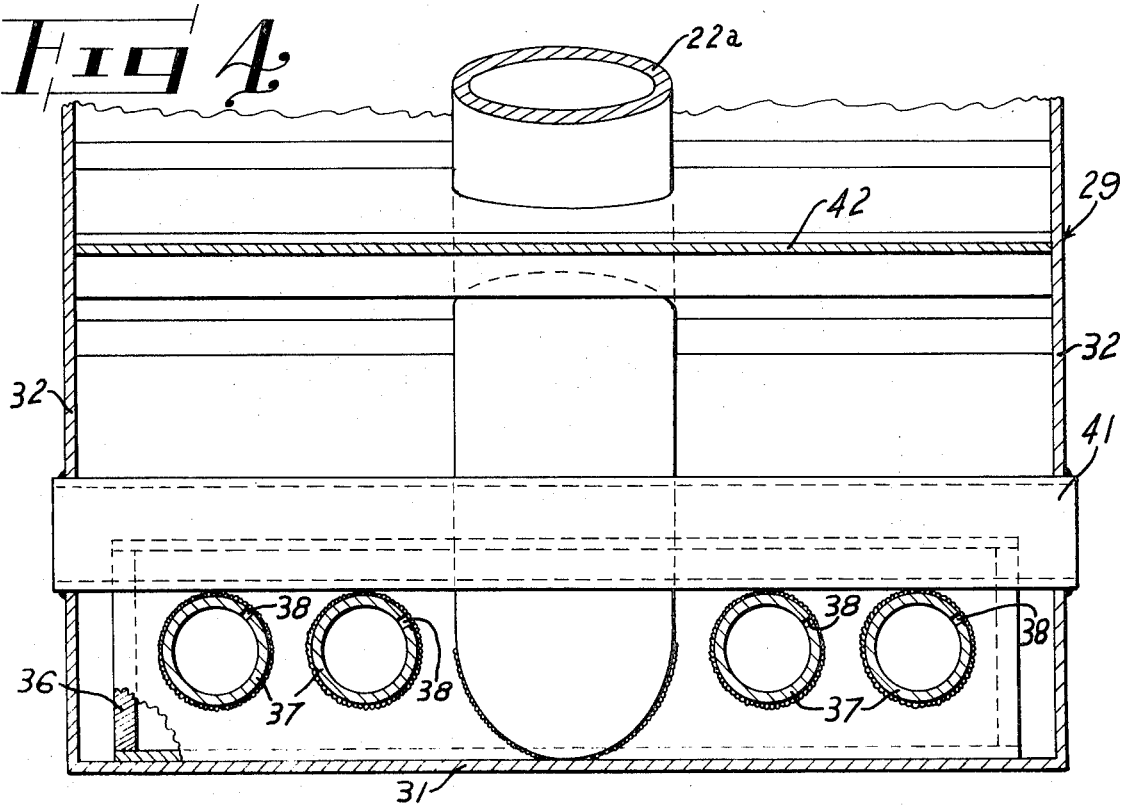

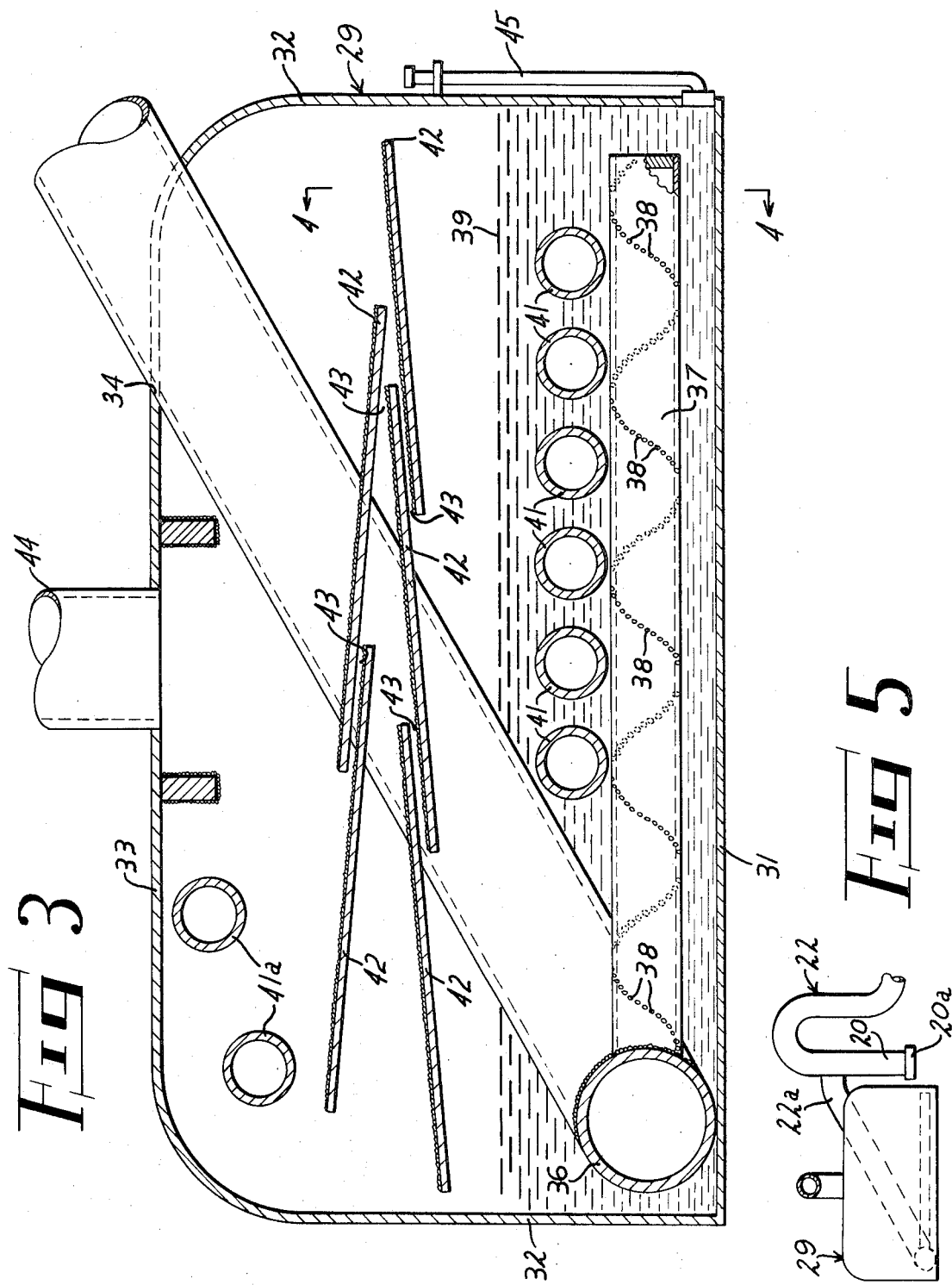

3,805,520

PROCESS AND APPARATUS FOR REDUCING AIR POLLUTION FROM INTERNAL COMBUSTION ENGINES

BACKGROUND OF THE INVENTION

This invention relates to a process and apparatus for reducing air pollution by the exhaust from an internal combustion engine by removing harmful constituents therefrom.

Our improved process and apparatus is particularly adapted for removing from the products of combustion such harmful components as hydrogen chloride, nitrogen oxides and sulfur dioxides. Heretofore in the art to which our invention relates, many devices have been proposed for removing such constituents from the products of combustion emitted from an internal combustion engine such as carbon monoxide and gross particulates. However, such processes have not been entirely satisfactory and often decrease the efficiency of operation of the internal combustion engine. Furthermore, such devices are complicated in construction and are difficult to maintain.

BRIEF SUMMARY OF THE INVENTION

In accordance with our present invention, we first separate the lighter fraction of the products of combustion from the heavier fraction. The lighter fraction is then recirculated to the intake of the engine while the heavier fraction is passed through a perforated system of conduits located within and adjacent the bottom of a closed chamber having a treating mixture therein comprising triethylolamine, fullers earth and ethylene glycol. The level of the treating mixture is maintained above the perforated conduits and is cooled by conduits which extend through the chamber with the open ends thereof outwardly of the chamber for receiving cooling air. Overlapping baffles extend transversely of the receptable above the mixture and a gas outlet is provided above the baffles for removing clean air.

DESCRIPTION OF THE DRAWINGS

Apparatus embodying features of our invention is illustrated in the accompanying drawings, forming a part of this application, in which:

FIG. 1 is a diagrammatic view showing the various components of our improved apparatus;

FIG. 2 is an enlarged, horizontal sectional view through the centrifugal separator for separating the lighter constituents from the heavier constituents;

FIG. 3 is an enlarged, vertical sectional view through the receptacle which is employed to separate the noxious fractions from the exhaust gases.

FIG. 4 is an enlarged, sectional view taken generally along the line 4—4 of FIG. 3; and, FIG. 5 is an enlarged view taken generally along the line 5—5 of FIG. 1, partly broken away and in section.

Referring now to the drawings for a better understanding of our invention, we show diagrammatically an internal combustion engine 10 having an air intake 11 and an exhaust port 12. Communicating with the exhaust port 12 by a conduit 13 is a centrifugal separator 14 which comprises an elongated tube-like member 16 closed at opposite ends by end walls 17 and 18. The end wall 17 is provided with an inlet opening 19 for receiving the end of the conduit 13 whereby the products of combustion are conveyed into the tube-like member 16. The end wall 18 is provided with an opening 21 for receiving a discharge conduit 22.

A helicoid 23 is mounted within the tube-like member 16 and extends longitudinally thereof with the longitudinal axis of the helicoid 23 being along the longitudinal axis of the tube-like member 16, as clearly shown in FIG. 2. A perforated conduit 24 extends along the longitudinal axis of the helicoid 23 and the tube-like member 16 with the end of the perforated tube 24 adjacent the inlet opening 19 being closed by a suitable plug member 26. The other end of the perforated conduit 24 extends laterally and passes through an opening 27 in the tube-like member 16 and is then connected to a conduit 28 which in turn communicates with the intake 11 for the internal combustion engine. Accordingly, as the products of combustion pass spirally around the flight of the helicoid 23, the heavier fraction of the gas, including any solids, are thrown outwardly toward the side wall of the tube-like member 16 and finally pass outwardly through the discharge opening 21 into the discharge conduit 22.

The lighter fraction of the products of combustion is drawn off through the perforated conduit 24 by the negative vacuum pressure of the air intake 11 and is then recycled to the intake 11 to be reconsumed. The recycling of the lighter fraction removed from the products of combustion is an important feature of our invention due to the fact that, inasmuch as the conduit 28 is under a negative pressure, the removal of the lighter constituents reduces the back pressure on the engine. Also, the light, hot gases introduced into the air intake contact the cool air drawn into the intake whereupon water vapor is formed which enhances the performance of the engine.

The heavier fraction separated from the products of combustion is conveyed by the discharge conduit 22 to a closed receptacle 29 having a bottomwall 31, side walls 32 and a top wall 33. As shown in FIG. 5, the discharge end of conduit 22 terminates in a collecting sump 20 for collecting heavy materials, such as carbon particles and liquids. The liquids, such as water, collected in the sump 20 combine with hydrogen chlorine gas to form hydrochloric acid, a portion of which is collected in the sump. The materials collected in the sump 20 are removed periodically by removing a plug member 20a provided in the bottom of sump 20. The sump 20 also serves as a cushion to absorb the forces transmitted thereto by the exhaust gases passing through conduit 22. Communicating with the conduit 22 above the sump 20 is a conduit 22a which forms an extension for conduit 22. As shown in FIG. 3, the discharge end of the conduit 22a extends through a suitable opening 34 provided in the top of the receptacle 29 and slopes downwardly toward the bottom wall 31 adjacent the opposite end of the receptacle 29. Secured to and communicating with the lower end of the conduit 22a is a transverse manifold 36 which is supported by the bottom wall 31, as shown. Communicating with the manifold 36 are a plurality of perforated tubes 37, the perforations being indicated at 38. As shown in FIG. 3, the perforations 38 are arranged spirally to bring about vigorous agitation of the treating mixture 39 placed within the receptacle 29. The perforated tubes 37 extend substantially the entire length of the receptacle 29 and are spaced from each other, as shown in FIG. 4.

As shown in FIGS. 3 and 4, a plurality of imperforate tubes 41 extend transversely through the receptacle 29 adjacent and above the perforated tubes 37 with the open ends of the imperforate tubes being outwardly of the receptacle 29 for receiving cooling air. That is, the ends of the tubes 41 are open whereby air is free to circulate therethrough to thus cool the treating mixture 39.

The treating mixture 39 is in the form of a liquid comprising triethylolamine, fullers earth and ethylene glycol with the level of the liquid mixture 39 being above the imperforate cooling tubes 41. Each 10 gallons of the treating mixture comprises from approximately 50 to 70 cubic centimeters triethylolamine, from approximately 6 to 9 gallons ethylene glycol and enough fullers earth is added to produce the 10 gallons of treating mixture. Preferably, each ten gallons of the treating mixture comprises approximately 60 cubic centimeters triethylolamine, approximately 8 gallons of ethylene glycol and approximately 10 pounds fullers earth.

In the event the receptacle 29 is formed of a material which will oxidize, such as steel, we add a suitable water soluble oil in an amount ranging from approximately ½ gallon to 1 gallon. In view of the fact that such water soluble oils are well known in the art, no further description thereof is deemed necessary. Where the receptacle 29 is formed of fiberglass, steel or other material which will not oxidize, the water soluble oil is not needed. However, the water soluble oil does have an additional beneficial use in that it acts as a dispersant which prevents layering out of water, which might freeze in winter and present an impediment to free flow of exhaust gases through the mixture.

A plurality of overlapping baffles 42 extend transversely of the receptacle 29 above the treating mixture 39 whereby the treating mixture remains in the lower portion of the receptacle 29. Suitable spaces 43 are provided between the baffles 42 whereby clean gases move into the upper portion of the receptacle 29 and are then discharged through a suitable discharge conduit 44. As shown in FIG. 3, additional cooling tubes 41a are provided in the upper portion of the receptacle 29 to further aid in cooling the contents of the receptacles. Accordingly, imperforate cooling tubes are provided both above and below the baffles 42, as shown. An L-shaped tube 45 is pivotally connected to and communicates with the receptacle 29, as shown, for introducing fresh treating mixture 39 and for removing spent treating mixture. To remove spent treating mixture the tube 45 is pivoted downwardly.

From the foregoing description, the operation of our improved apparatus and the manner in which our improved process is carried out will be readily understood. The products of combustion are conveyed through conduit 13 to the centrifugal separator 14 where the lighter fraction of the products of combustion is discharged through conduit 28 and is then recycled to the intake 11 of the internal combustion engine for reburning. Accordingly, this not only removes pollutant gases but also enhances the performance of the engine due to the fact that the pre-heated gases flowing through the conduit 28 are combustible and a negative pressure is created within the conduit 28 to thus remove back pressure from the engine. Also, the hot gases passing through the conduit 28 contact the cooler gases introduced into the intake 11 whereupon vapor is created to further improve the efficiency of operation of the engine 10.

The heavier fraction, including any solid particles, is discharged through the outlet 21 into the conduit 22 whereupon it is then conveyed downwardly by conduit 22a to the manifold 36 and is then finally discharged through the spirally arranged perforations 38. The spiral arrangement of the openings 38 brings about vigorous agitation of the liquid mixture 39 whereby pollutants, such as hydrogen chloride, nitrogen oxides and sulfur dioxides are readily removed. The formation of hydrochloric acid in a dilute solution not only removes hydrochloric acid from the gases emitted to the atmosphere, but also neutralizes corrosive bases. Since air is free to flow through the cooling conduits 41, the contents of the receptacle 29 are not overheated. Also, the mixture of fullers earth with ethylene glycol in the liquid mixture 39 helps in reducing the temperature within the receptacle. The combination of the fullers earth and triethylolamine causes hydrocarbons, oils, solids and other pollutants mentioned above to be trapped in the treating mixture 39 whereupon clean gases are then free to pass upwardly between the baffles 42 for discharge through the outlet 44. The triethylolamine is employed to prevent rusting and clogging of the circulation openings 38. It is believed that the fullers earth in the mixture adsorbs road film, oil, gross particulates, hydrocarbons, oxides of nitrogen and sulfuroxides. Then, the cleaning action of dilute hydrochloric acid, which is formed when hydrogen chloride gases from the engine exhaust deliquesces the water vapor that is formed when the hot exhaust gases suddenly strike the thermal interface posed by the ethylene glycol, assures that the fullers earth is continuously cleaned of impurities it has temporarily adsorbed. These impurities then settle to the bottom of receptacle 29. The alkaline constituents of the impurities tend to keep the hydrogen ion concentration of the mixture at a low acidity level. The ethylene glycol in addition to reducing the temperature of the mixture 39 also prevents freezing at low temperatures while the water soluble oil prevents oxidation of the receptacle where the receptacle is formed of a material which will oxidize, such as steel.

From the foregoing, it will be seen that we have devised an improved process and apparatus for reducing air pollution by the exhaust from an internal combustion engine. Our improved apparatus is also extremely simple of construction, economical of manufacture and may be readily installed on conventional vehicles, such as automobiles, trucks and the like. Furthermore, by providing apparatus which will not only remove pollutants from the exhausts emitted from an internal combustion engine but will also enhance the performance of the engine, our apparatus is extremely economical in operation. Furthermore, our improved system provides for all-weather recycling of preheated, combustible elements that would otherwise go into the atmosphere. Furthermore, our improved system employs a combination of chemical, mechanical and thermal interface components which produce condensation within a closed chamber thereby causing conversion of hydrogen chloride to dilute and readily neutralized hydrochloric acid and at the same time solid particulate matter and other pollutants are removed.

While we have shown our invention in but one form, it will be obvious to those skilled in the art that it is not so limited, but is susceptible of various other changes and modifications without departing from the spirit thereof.

What we claim is:

1. A process for reducing air pollution by the exhaust from an internal combustion engine having an exhaust port for the products of combustion and an air intake, a separating the lighter fraction of the products of combustion from the heavier fraction thereof, b passing said lighter fraction of the products of combustion to said intake for reburning, c passing said heavier fraction of the products of combustion through perforated conduits located within and adjacent the bottom of a closed chamber having a treating mixture therein comprising triethylolamine, fullers earth and ethylene glycol with the level of said treating mixture being above said perforated conduits, d cooling said treating mixture, and e removing gases from an upper portion of said receptacle.

2. The process for reducing air pollution as defined in claim 1 in which each 10 gallons of said treating mixture comprises from approximately 50 to 70 cubic centimeters triethylolamine, from approximately 6 to 9 gallons ethylene glycol and enough fullers earth is added to produce said 10 gallons of treating mixture.

3. The process for reducing air pollution as defined in claim 1 in which each 10 gallons of said treating mixture comprises approximately 60 cubic centimeters triethylolamine, approximately 8 gallons ethylene glycol and approximately 10 pounds fullers earth.

4. The process for reducing air pollution as defined in claim 1 in which from approximately 0.5 to 1 gallon of water soluble oil is added to form each 10 gallons of said treating mixture.

* * * * *